United States Patent [19]

Shockley et al.

[11] Patent Number: 4,755,803
[45] Date of Patent: Jul. 5, 1988

[54] AIR BRAKE MANIFOLD ALL LEVEL RESET

[75] Inventors: James F. Shockley, Montgomery County, Md.; Emilio A. Fernandez, Fairfax County, Va.; Angel P. Bezos, Montgomery County, Md.

[73] Assignee: Pulse Electronics, Inc., Rockville, Md.

[21] Appl. No.: 54,449

[22] Filed: May 27, 1987

[51] Int. Cl.⁴ .............................................. B60Q 1/00
[52] U.S. Cl. ................................. 340/626; 340/52 C; 73/121; 307/118; 188/151 A; 303/20; 303/86
[58] Field of Search ................... 73/39, 49.5, 121, 129, 73/199; 340/626, 56, 59, 60, 52 C, 52 B, 511; 307/10 R, 118, 139, 351, 353, 144; 188/151 A; 303/20, 86; 246/185, 167 R; 328/114, 132

[56] References Cited

U.S. PATENT DOCUMENTS 3,748,656  7/1973  Gray et al. ........................ 340/626
4,361,825 11/1982  Shockley ........................... 340/626
4,696,446  7/1987  Mochizuki et al. ............. 246/169 R Primary Examiner—Joseph A. Orsino
Assistant Examiner—Jill D. Jackson
Attorney, Agent, or Firm—C. Lamont Whitham; Michael E. Whitham

[57] ABSTRACT

An improved automatic train-line air brake pressure monitoring system includes circuits that emulate an automatic brake valve and cause an automatic brake manifold release whenever a four psi increase in pressure is sensed. The system includes a pressure sensor amplifier (10) which provides a signal proportional to the sensed pressure in a brake pipe. This signal is tracked by a peak hold circuit (12) that stores the peak value of the signal. The output of the sensor amplifier is subtracted from the output of the peak hold circuit in a subtractor (14) to provide a difference signal. The difference signal is tracked by a reduction hold circuit (22) which stores the minimum value of the difference output from the subtractor. An increase in measured pressure from the stored minimum value is compared in a comparator (24) with a reference value representing the four psi level, and when the increased pressure exceeds the reference value, a system reset is generated.

6 Claims, 3 Drawing Sheets

AIR BRAKE MANIFOLD ALL LEVEL RESET

BACKGROUND OF THE INVENTION

1. Field of the Invention

The present invention generally relates to improvements in automatic train-line air brake pressure monitoring systems and, more particularly, to a modification of such systems which replaces the reset or release circuits with circuits that emulate an automatic brake valve and cause an automatic brake manifold release whenever a four psi increase in pressure is sensed.

2. Description of the Prior Art

In U.S. Pat. No. 4,361,825, there is disclosed an automatic train-line air brake pressure monitoring system which includes a peak detector and hold circuit that determines the peak voltage of an input signal representing the air pressure in the air brake system. More specifically, an auto-referencing peak detector circuit is periodically reset prior to each pressure detection by a subtraction circuit such that the pressure is always measured with respect to the last measured air brake pressure value. The automatic monitoring system provides output signals on a continuous basis representative of the elapsed time air brakes are applied or released, as well as an indication of the quantity of the braking effort.

Railroad air brake systems typically operate in a released or off position with a compressed air pressure within a range of typically 70 psi to 100 psi. Application of the brakes is caused by a reduction in the air pressure on the brake pipe to all the cars. The more air pressure that is removed from the brake pipe, the greater the braking effort. An emergency braking application is provided if the air pressure drops below a certain specified minimum value.

In accordance with the invention disclosed in U.S. Pat. No. 4,361,825, whenever air pressure is reduced within the brake pipe system, the pressure drop from the maximum is measured and quantized, and an output indicative thereof is provided. The number of steps desired to be recorded, that is the number of pressure reductions, and the pressure differential setting for each step can be varied and programmed into the system. The air brake monitoring system also provides means for providing signals indicative of a release of the air brakes, as would occur with an increase in air pressure in the brake line. An emergency output signal can be provided indicative of a reduction of air pressure within the brake line below a predetermined threshold value.

The peak detector holds or stores a maximum detected voltage, proportional to air brake pressure, which is subtracted from the output of a transducer indicating the current air pressure in the brake line. Under normal conditions, that is under a brake released or off condition of the brake system, the resulting voltage output of the subtractor is zero and this provides a signal representing a "brakes released" condition. A drop in the detected pressure of the air line causes a negative signal at the output of the subtractor. When the magnitude of this pressure drop exceeds a pre-set threshold voltage, a "brakes applied" trigger signal output is provided to the monitoring system. The trigger signal output also resets the peak detector to the presently detected transducer voltage, such that the subtractor again has a zero voltage output. Such a process is repeated for each step of brake application.

When the brakes are released, the pressure transducer provides an increasing voltage output, and the voltage output of the subtractor therefore goes negative. When such negative signal exceeds a pre-set threshold, the output signal of the monitoring system provides a "brakes released" signal condition. The output signals of the automatic air pressure train-line monitoring system disclosed in U.S. Pat. No. 4,361,825 can be utilized to actuate a digital or analog recorder to provide a permanent record of the monitoring system outputs.

An alternate air brake monitor (ABM) system has been successfully implemented using a digital peak detector circuit. Similarly to the air brake pressure monitoring system disclosed in U.S. Pat. No. 4,361,825, in the digital ABM system whenever air pressure is reduced within the brake pipe system, the pressure drop from the maximum is measured and quantized, and an output indicative thereof is provided. The digital peak detector holds or stores a maximum quantized value which is proportional to air brake pressure. This quantized value is subtracted from the quantized output value from a transducer to indicate the current air pressure in the brake line. The output of the subtractor is zero under normal conditions indicating a "brake released" condition. A drop in the detected pressure of the air line results in a nonzero output with a negative sign from the subtractor. This nonzero output is compared in a plurality of comparators, each with an increasingly larger stored value, and when the nonzero output exceeds the first stored value, a "brakes applied" signal output is provided to the monitoring system. As the nonzero output exceeds the stored values for the other comparators, outputs from those comparators are used to provide signals that provide a digital indication of the progression of the application of the brakes. When the brakes are released, the pressure transducer provides an increasing voltage output which, when quantized, results in a smaller nonzero output from the subtractor. When that nonzero output falls below the first stored value, a "brakes released" condition is signaled.

While the prior automatic brake monitoring systems have functioned well in most situations, certain problems in operation have been experienced. The prior systems typically reset only on increasing pressure from either six or fourteen psi reduction or from release of an emergency condition. A problem in the operation arises when the locomotive pressure regulating feed-valve is changed. For example, if a locomotive comes from a coal train set at 110 psi, cuts off the train, reduces the feed-valve to 75 psi, and then connects to another train, the automatic brake monitoring system "stores" a 35 psi reduction. This causes the system to show a full application of air brakes so that it cannot be reset without an emergency condition being imposed. The failure of the system to properly reset can result in erroneous recordings showing continuous reductions throughout the recording tape.

Additionally, trailing units in a locomotive consist may or may not have their PC switch reset after an emergency condition. The PC switch is a device monitored by the ABM which closes on emergency or full service brake application. If it does not reset, the locomotive still operates but the automatic brake monitor "sticks" in "PC Switch Open" condition and over-rides the other functions of the ABM.

Premature "release" indications are also possible if the magnitude of a brake application is close to the preset threshold set points. Since the ABM senses the brake pipe pressure near the exhaust end of a string of railroad cars containing a volume of pressurized air and limited flow capacity, the pressure drops below the average pipe pressure and increases when the exhaust is cut off. Hence, a reduction in pressure having a value close to the preset threshold value may be sensed and recorded, followed by an erroneous release produced by a pressure value just above the threshold. For example, if the pressure at the automatic brake monitor is sensed as a 14.2 psi reduction during the brake reduction, followed by 13.8 psi reduction when the flow stops, the automatic brake monitor will reset and show a "released" condition if the threshold is 14.0 psi.

SUMMARY OF THE INVENTION

It is therefore a general object of the present invention to provide a modification to the earlier automatic train-line air brake pressure monitoring circuit which is effective in overcoming the foregoing problems.

It is another, more specific object of this invention to provide the automatic train-line brake pressure monitoring circuit with a reset circuit that provides a release whenever a predefined increase in pressure is sensed.

It is a further object of the invention to provide an automatic train-line brake pressure monitoring circuit capable of proper operation under a wide range of conditions without storing the magnitude of a previous pressure reduction and without being tied directly to the PC switch.

The objects of the invention are accomplished by providing a reduction hold circuit which follows or tracks the decrease in pressure from a peak value and stores the differential change in pressure when the pressure in the brake pipe stabilizes to a new value. Then when the brake pipe pressure again increases, a comparison is made based on the stored differential value and a predefined increase in pressure from that value to produce the reset signal. Since comparisons are now made on relative values rather than absolute values, the problems of failure to properly reset without an emergency condition or a premature release encountered in the prior automatic brake monitoring systems are avoided.

BRIEF DESCRIPTION OF THE DRAWINGS

The foregoing and other objects, aspects and advantages of the invention will be better understood from the following detailed description of the preferred embodiment of the invention with reference to the drawings, in which.

DETAILED DESCRIPTION OF THE PREFERRED EMBODIMENT OF THE INVENTION

Figure 1:
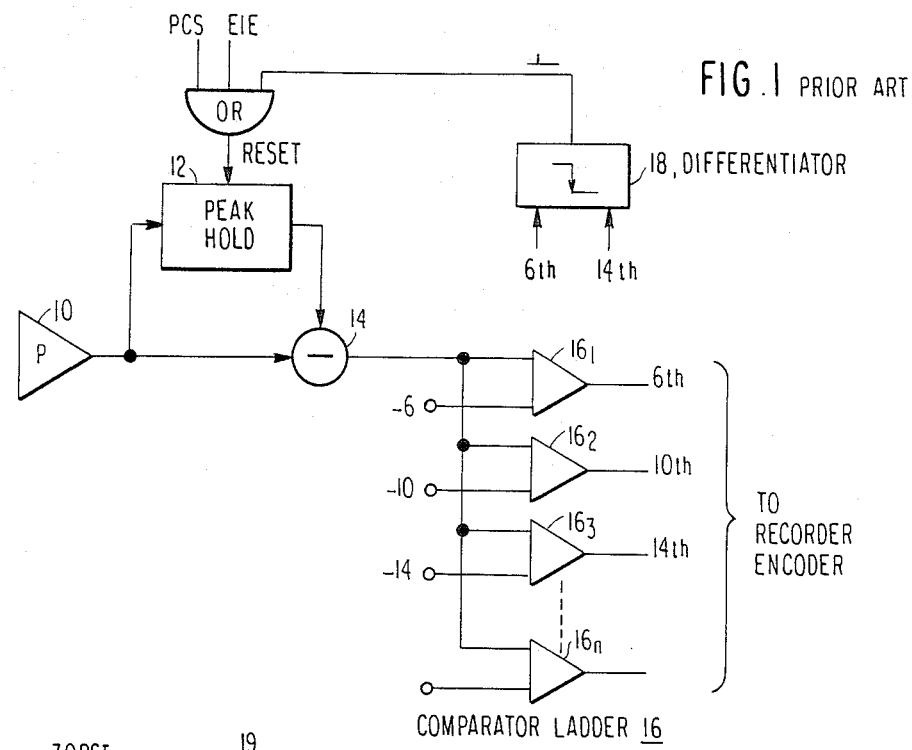
FIG. 1 is a fragmentary block diagram of the current model of the automatic train-line air brake monitoring system.

Referring now to the drawings, and more particularly to FIG. 1, there is shown in fragmatary block diagram form the relevant parts of the current automatic train-line brake monitoring (ABM) circuit for purposes of illustrating the basic operation of that circuit. A voltage signal proportional to the absolute magnitude of the brake pressure is provided by an operational amplifier 10 which is connected to a pressure transducer (not shown). The output of amplifier 10 is supplied to a digital peak hold circuit 12 and a subtractor 14, the other input to the subtractor 14 being supplied by the output of the peak hold circuit 12. For more information on these basic circuits, the reader is referred to the above-referenced U.S. Pat. No. 4,361,825.

The digital peak hold circuit 12 is basically a combination of an analog-to-digital and digital-to-analog converter. The digital value produced by the analog-to-digital portion of the converter is proportional to the peak pressure signal output of operational amplifier 10. The analog-to-digital-to-analog converter holds the peak pressure value until reset by a reset signal to clear the value to zero and store the next peak value. The subtractor 14 is basically an operational amplifier having a summing junction and providing an output proportional to the difference between the two inputs.

The output of the subtractor 14 is connected to the input of a comparator ladder 16. This is simply a series of voltage comparators $16_1, 16_2, 6_3, \ldots, 16_n$, each having one input connected to the output of subtractor 14 and the other input connected to a source of reference voltage. The reference voltages for the several voltage comparators may itself be derived from a precision voltage divider supplied by a well regulated, precision voltage source. As shown, voltage comparator $16_1$ is connected to a voltage proportional to a pressure of 6 psi, voltage comparator $16_2$ is connected to a voltage proportional to a pressure of 10 psi, voltage comparator $16_3$ is connected to a voltage proportional to a pressure of 14 psi, and so on. An output from any one of these comparators is generated whenever the input voltage from subtractor 14 exceeds the reference voltage for that comparator. The outputs from the comparators are all connected to a recorder encoder to provide an encoded output signal for recording. In the current circuit, the outputs from the voltage comparators $16_1$ and $16_3$, representing decreases in pressure of 6 psi and 14 psi, respectively, are connected to the input of a differentiator 18. Thus, a change in the output from either of these two voltage comparators from a "1" to a "0" will be differentiated to produce a trailing edge voltage pulse to the reset input of the peak and hold circuit 12. Additionally, the signal from differentiator 18 is ORed with a PC switch signal or Engineman Induced Emergency (EIE) signal to likewise reset the peak and hold circuit 12. As is the case in the prior art, if the external PC switch or EIE signals should fail, the ABM is thereby inhibited. Likewise, if the magnitude of the comparator ladder 16 voltage is very large, the differentiator 18 may not pass the 6 psi and 14 psi threshold points and the ABM cannot properly reset.

Figure 2:
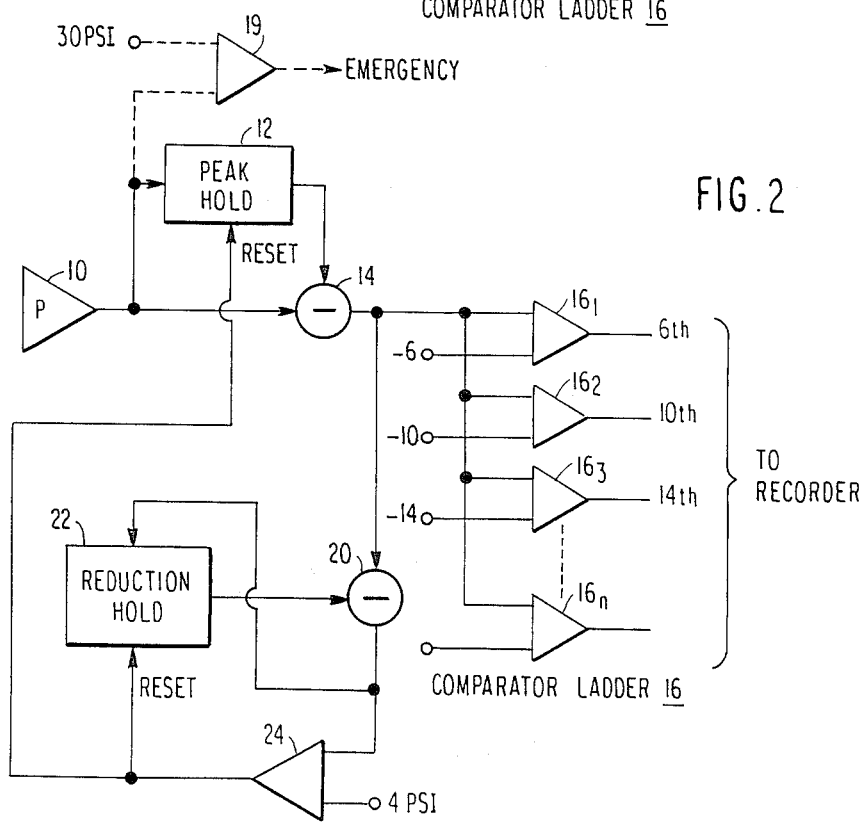
FIG. 2 is a fragmentary block diagram the modification of the system shown in FIG. 1 according to one aspect of the invention.

The prior circuit is modified, in part, as shown in FIG. 2 which, like FIG. 1, is a fragmentary block diagram illustrating the principal parts of the circuit. In FIG. 2, like reference numerals as used in FIG. 1 identify the same or equivalent circuits, and these will not be described in more detail except as may be necessary to understand the modification according to the invention. The changes in the basic circuit illustrated in FIG. 2 are the replacement of the reset differentiator 18 and the addition of a separate voltage comparator 19 to detect an emergency condition. The differentiator 18 is replaced with a circuit which emulates a typical freight car ABD valve and causes an automatic brake monitor release whenever a four psi increase is sensed. This circuit comprises a second subtractor 20 and a reduction hold circuit 22. The reduction hold circuit 22 is analogous to peak hold circuit 12, except that it stores minimum pressure values. It, like the peak hold circuit 12, functions in combination with subtractor 20 as an analog-to-digital-to-analog converter. The output of subtractor 14 is connected to one input of the subtractor 20, and the output of subtractor 20 is connected to the input of the reduction hold circuit 22. As will be explained in more detail with reference to FIG. 3, the input to the reduction hold circuit 22 from subtractor 20 gates a clock signal which is counted to provide the digital value stored by the reduction hold circuit. The other input to the subtractor 20 is supplied by the output of the reduction hold circuit 22, and the output of subtractor 20 is compared in a voltage comparator 24 with a voltage representing a 4 psi signal. The output of the voltage comparator 24 is the reset signal which is supplied to the peak hold circuit 12. This output is also used to reset the reduction hold circuit 22. As will be described in more detail with reference to FIG. 3, the reduction hold circuit 22 comprises a gated clock and a counter controlled by the output of subtractor 20 to form the analog-to-digital portion of the circuit and a resistive network to form the digital-to-analog portion of the circuit.

Figure 3:
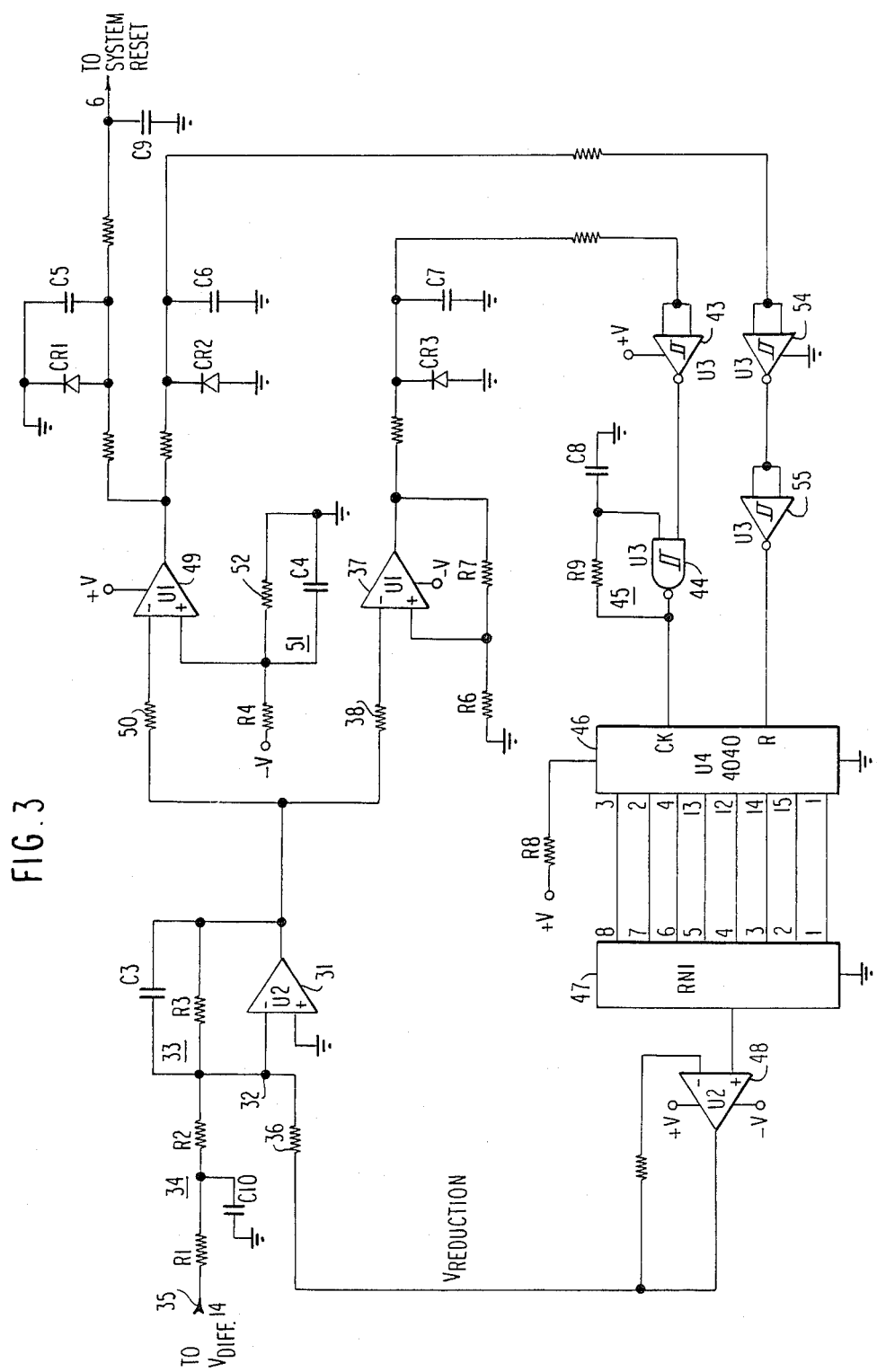
FIG. 3 is a detailed schematic diagram of the modified circuit according to the invention.

As shown in FIG. 3, the subtractor 20 is implemented as a summing amplifier comprising an operational amplifier 31 having its negative input connected to a summing junction 32 and its positive input connected to circuit ground. The summing junction 32 is connected in turn to an RC feedback circuit 33 comprising resistor R3 and capacitor C3, a precision RC input circuit 34 comprising resistors R1 and R2 and capacitor C10 and connected to input terminal 35, and a precision input resistor 36 which is connected to the output of reduction hold circuit 22. The RC feedback circuit 33 and the RC input circuit 34 respectively provide output and input low pass filtering for the summing amplifier. Input terminal 35 is connected to the output of subtractor 14 in FIG. 2.

The output of operational amplifier 31 is a voltage proportional to the sum of the difference voltage signal ($V_{DIFF}$) output from subtractor 14 and the reduction voltage signal ($V_{RED}$) output from the reduction hold circuit 22; however, since summing junction 32 is connected to the negative or inverting input terminal of operational amplifier 31, the output of the summing amplifier is $-(V_{DIFF}+V_{RED})$ or $-V_{DIFF}-V_{RED}$.

The output of the summing amplifier comprising operational amplifier 31 is supplied to a comparator comprising a second operational amplifier 37 via a resistor 38 connected to the negative input of the operational amplifier 37. The positive input of the operational amplifier 37 is connected to a summing junction to which is connected a first resistor R6 connected to circuit ground and a second resistor R7 connected to the output of operational amplifier 37 to provide a positive feedback. The positive feedback causes the operational amplifier 37 to act as a switch that normally provides a $+V$ of the supply voltage as an output, but when the output of the operational amplifier 31 goes positive, operational amplifier 37 switches to an negative output voltage equal to $-V$ of the supply voltage.

When the output of operational amplifier 37 switches to a negative output voltage, the level of the output voltage is clipped by diode CR3 and filtered by capacitor C7 to produce a digital logic "1" signal. This digital logic "1" signal is inverted by a NAND gate 43 connected as an inverter to produce a digital logic "0" signal to the input of a NAND gate 44. NAND gate 44 is connected as a free running astable multivibrator or clock with an RC feedback circuit 45 comprising resistor R9 and capacitor C9. The digital logic "0" signal from the NAND gate 43 enables NAND gate 44 which provides clock pulses to a binary counter 46. The outputs of the binary counter 46 are supplied to the inputs of a precision resistive network 47 which converts the digital count from binary counter 46 to an analog voltage signal. This analog voltage signal is buffered by a voltage follower comprising a third operational amplifier 48 and supplied as the $V_{RED}$ signal to the summing junction 32 of operational amplifier 31 via precision resistor 36.

To complete the description of the circuit shown in FIG. 3, the output of operational amplifier 31 is also connected to comparator 24. Comparator 24 comprises a fourth operational amplifier 49 which has its negative input connected to the output of operational amplifier 31 via a precision input resistor 50. The positive input of operational amplifier 49 is connected to a reference voltage network 51 comprising resistor R4, precision resistor 52 and capacitor C4. This reference voltage network 51 supplies a reference voltage proportional to a pressure of 4 psi to operational amplifier 49. When the output of operational amplifier 31 falls below this reference, the output of operational amplifier 49 switches from a low or $-V$ level voltage to a high voltage equal to $+V$ of the supply voltage.

The output of operational amplifier 49 is supplied to two branch reset circuits. The first of these comprises a positive clipping diode CR1 and filter capacitor C5 which shapes the output voltage level that is supplied as the reset signal to peak hold circuit 12. This reset signal is further filtered by a low pass filter comprising resistor R5 and capacitor C9. The second branch reset circuit comprises a negative clipping diode CR2 and filter capacitor C6 which shapes the output voltage level of operational amplifier 49. This output is further buffered and shaped by a pair of NAND gates 54 and 55 connected as inverters to supply the correct level reset signal to the reset input of binary counter 46.

In the implementation shown in FIG. 3, the operational amplifiers 31, 37, 48 and 49 may all be CA-1458-type integrated circuits (ICs). These come two amplifiers to an IC package so that, for example, amplifiers 31 and 37 could be implemented with one IC package and amplifiers 48 and 49 could be implemented with a second IC package. The NAND gates 43, 44, 54, and 55 may be implemented with a CD-4093-type IC, which has four NAND gates in the IC package. The binary counter may be implemented with a CD-4040-type IC. The resistive network 47 may be implemented with a 316L08-104 IC. Those skilled in the art will, of course, recognize that these circuits are identified by way of example only and that other, equivalent circuits may be used in the practice of the invention.

Figure 4A:
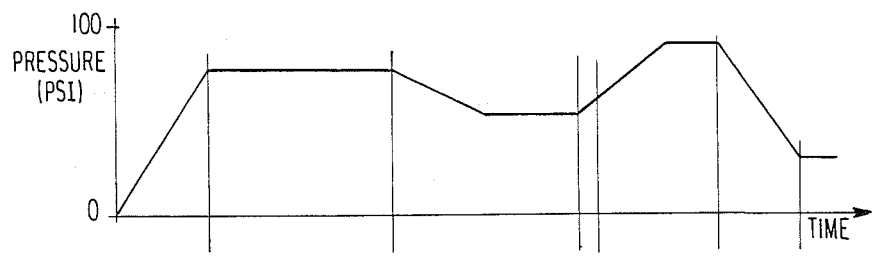
FIGS. 4A to 4F are waveform diagrams providing a graphical representation of the operation of the circuit of FIG. 3.
Figure 4B:
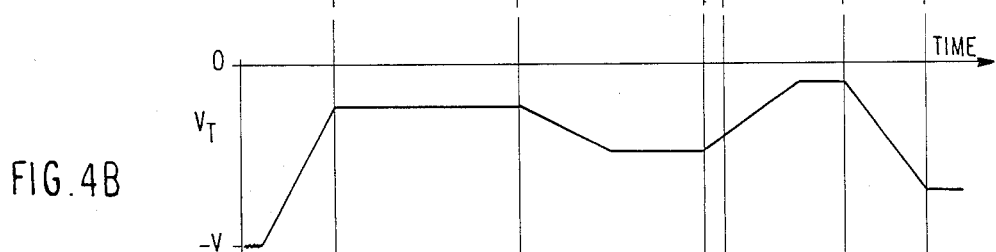

The operation of the circuit shown in FIG. 3 will be better understood with reference to the waveform diagrams shown in FIGS. 4A to 4F. FIG. 4A represents the pressure in psi in a train brake pipe. FIG. 4B is the voltage waveform produced by a pressure transducer which senses the pressure in the brake pipe. The voltage output from the transducer, $V_T$, is a negative voltage which increases toward zero volts with increasing pressure in the brake pipe. The voltage waveform in FIG. 4B mirrors the pressure waveform in FIG. 4A.

Figure 4C:
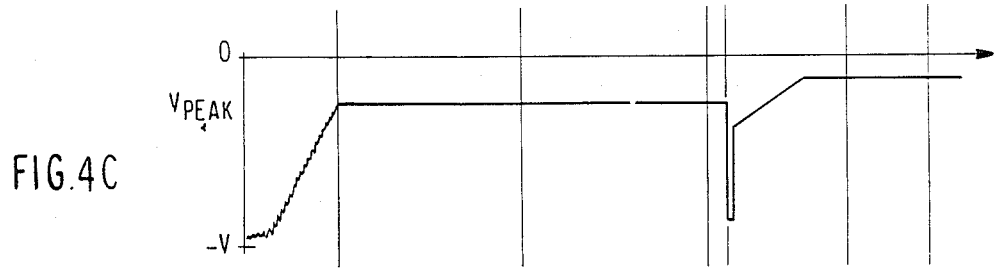
Figure 4D:
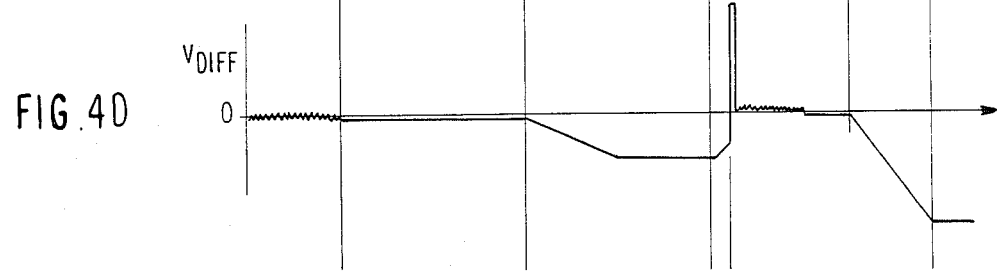

The action of the peak hold circuit 12 is shown in FIG. 4C. Notice that the voltage output of the peak hold circuit is also a negative voltage and increases toward zero volts as the pressure increases in the brake line; however, when the pressure decreases with a corresponding decrease in the voltage $V_T$ from the pressure transducer, the output of the peak hold circuit does not fall but, rather, holds at the highest voltage level previously output by the pressure transducer. The output of the subtractor 14 is $V_{DIFF}$ which is the transducer voltage $V_T$ minus the output of the peak hold circuit, $V_{PEAK}$. As shown in FIG. 4D, the difference voltage output from subtractor 14 is zero as long as the pressure in the brake line is increasing or constant since the inputs to the subtractor 14 are equal. On the other hand, a decrease in brake line pressure results in a negative going voltage signal from subtractor 14. This negative going voltage signal is supplied as one input to the summing junction 32 of operational amplifier 31 which comprises the subtractor 20. At this point in time, however, there is no input from the reduction hold circuit 22. As a result, the positive output voltage from operational amplifier 31 causes the output of operational amplifier 37 to switch negative, enabling the astable multivibrator or clock comprising NAND gate 44 to generate clock pulses to the binary counter 46.

Figure 4E:
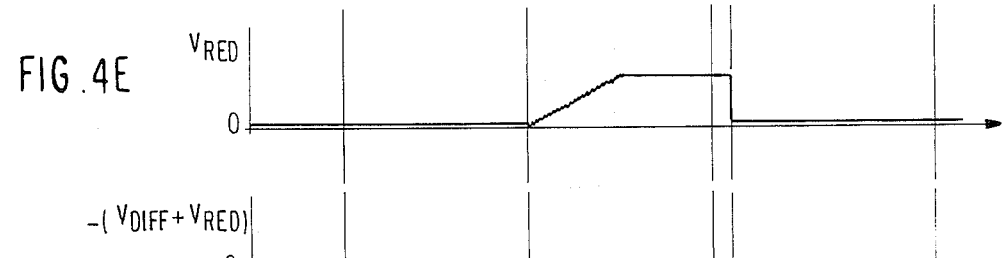

As the binary counter 46 counts up in response to the clock pulses, the reduction voltage $V_{RED}$ increases as shown in FIG. 4E. This voltage continues to increase as long as the brake line pressure falls. When the brake line pressure assumes a constant value, the output of operational amplifier 31 goes to zero causing operational amplifier 37 to switch from a negative output level to a positive level. This binary "0" logic level signal is inverted by NAND gate 43 to supply a binary logic "1" forcing the output of NAND gate 44 to a binary logic "0" and turning off the clock pulses to the binary counter 46.

Figure 4F:
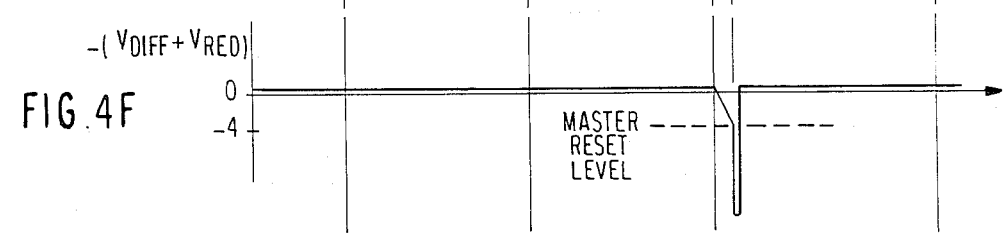

Now when the pressure in the brake line again begins to increase, the output voltage $V_{DIFF}$ from subtractor 14 begins to increase as seen in FIG. 4D. $V_{RED}$ holds at a constant positive value so that the output of operational amplifier 31 begins to fall as generally indicated in FIG. 4F. When the output of operational amplifier 31 falls to below the 4 psi reference level of comparator 24, the output of operational amplifier 49 comprising the comparator switches producing a reset signal to peak hold circuit 12 and to binary counter 46. At that point, as shown in FIG. 4C, the output of the peak hold circuit again begins to track the pressure transducer output. This causes both inputs to subtractor 14 to be equal with the result that its output is again zero as shown in FIG. 4D. At this point the process repeats.

In summary, the reduction hold circuit allows comparisons in sensed pressure increases to be made on relative rather than absolute values of sensed pressure. By storing a value representative of the differential pressure between the peak value and a decrease from that peak value and using the differential value as the base point of reference for measuring any increase in pressure, the system reset is correctly generated without resort to an emergency condition or without an indication of a false release.

While the invention has been described in terms of a preferred embodiment, those skilled in the art will appreciate that the invention may be practiced with modification within the spirit and scope of the appended claims.

Having thus described our invention, what we claim as new and desire to secure by Letters Patent is as follows:

1. An improvement in an air brake monitor system of the type including pressure sensing means for generating a pressure signal proportional to a sensed pressure in a brake pipe, peak hold means connected to said pressure sensing means for tracking said pressure signal as said pressure signal increases or remains constant and holding a value proportional to maximum value of said pressure signal, and subtraction means having first and second inputs connected respectively to said pressure sensing means and said peak hold means and providing a difference output signal proportional to the difference between said maximum value and the pressure signal from said pressure sensing means, the improvement comprising:

reduction hold means connected to said subtraction means for tracking said difference output signal and holding a value proportional to a minimum value of said difference output signal; and comparator means connected to said reduction hold means for comparing an increase in measured pressure relative to said minimum value with a predefined value, said comparator means providing a system reset signal when said increase in measured pressure exceeds said predefined value.

2. The improved air brake monitor system as recited in claim 1 wherein said reduction hold means includes an analog-to-digital converter which stores a digital value proportional to said minimum value, said analog-to-digital converter being responsive to said system reset for setting said digital value to zero.

3. The improved air brake monitor system as recited in claim 2 wherein said reduction hold means comprises:

second subtraction means for receiving as one input said first mentioned difference output signal, said subtraction means providing as an output a second difference signal;

level detection means responsive to said second difference signal for providing a gating signal when said second difference signal is changing in value;

gated clock means responsive to said gating signal for producing clock signals for the duration of said gating signal;

counter means responsive to said clock pulses for counting and holding a digital value proportional to said minimum value, said counter means further being responsive to said system reset for being reset to a zero count; and digital-to-analog converter means responsive to the count in said counter means for generating an analog signal, said analog signal being connected as a second input to said second subtraction means, the output of said second subtraction means being connected to said comparator means.

4. The improved air brake monitor system as recited in claim 1 wherein said peak hold means includes an analog-to-digital converter which stores a digital value proportional to said maximum value, said analog-to-digital converter being responsive to said system reset for setting said digital value to zero.

5. The improved air brake monitor system as recited in claim 1 wherein said peak hold means includes a first analog-to-digital converter which stores a first digital value proportional to said maximum value and wherein said reduction hold means includes a second second analog-to-digital converter which stores a digital value proportional to said minimum value, said first and second analog-to-digital converters each being responsive to said system reset for setting said first and second digital values to zero.

6. A method for monitoring air brake pressure comprising the steps of:

generating a pressure signal proportional to a sensed air pressure;

storing a peak value of said pressure signal;

generating a difference signal proportional to the difference between said pressure signal and said peak value;

storing a minimum value of said difference signal; and comparing an increase in said pressure signal from said minimum value with a predefined value and generating a system reset when said increase exceeds said predefined value.

* * * * *